United States Patent
Kasai

(10) Patent No.: US 11,034,561 B2
(45) Date of Patent: Jun. 15, 2021

(54) CHAIN BLOCK

(71) Applicant: KITO CORPORATION, Yamanashi (JP)

(72) Inventor: Takayuki Kasai, Yamanashi (JP)

(73) Assignee: KITO CORPORATION, Yamanashi (JP)

( * ) Notice: Subject to any disclaimer, the term of this patent is extended or adjusted under 35 U.S.C. 154(b) by 0 days.

(21) Appl. No.: 16/500,576

(22) PCT Filed: Dec. 28, 2017

(86) PCT No.: PCT/JP2017/047184
§ 371 (c)(1),
(2) Date: Oct. 3, 2019

(87) PCT Pub. No.: WO2018/189968
PCT Pub. Date: Oct. 18, 2018

(65) Prior Publication Data
US 2020/0062559 A1      Feb. 27, 2020

(30) Foreign Application Priority Data

Apr. 13, 2017 (JP) .............................. JP2017-079909

(51) Int. Cl.
*B66D 3/16* (2006.01)
*F16D 27/01* (2006.01)
(Continued)

(52) U.S. Cl.
CPC .............. *B66D 3/16* (2013.01); *F16D 27/01* (2013.01); *B66D 1/225* (2013.01); *F16D 11/14* (2013.01);
(Continued)

(58) Field of Classification Search
CPC ........... B66D 3/16; B66D 1/225; F16D 27/01; F16D 11/14; F16D 27/14; F16D 43/2024; F16D 43/20; F16H 2055/176; F16H 1/28
See application file for complete search history.

(56) References Cited

U.S. PATENT DOCUMENTS

| | | |
|---|---|---|
| 2012/0286609 A1 | 11/2012 | Kasai |
| 2013/0200319 A1 | 8/2013 | Kasai |
| 2013/0206534 A1 | 8/2013 | Kasai et al. |

FOREIGN PATENT DOCUMENTS

| | | |
|---|---|---|
| CN | 103109107 A | 5/2013 |
| EP | 1617797 B1 | 8/2012 |

(Continued)

OTHER PUBLICATIONS

International Search Report corresponding to Application No. PCT/JP2017/047184; dated Feb. 27, 2018.
(Continued)

*Primary Examiner* — Sang K Kim
*Assistant Examiner* — Nathaniel L Adams
(74) *Attorney, Agent, or Firm* — Cantor Colburn LLP

(57) ABSTRACT

A chain block comprises: a first rotary body in which a first tooth part f is arranged; a second rotary body comprising a second tooth part which opposes to a first tooth part with magnetic attraction force and releasing the magnetic coupling state by sliding toward thrust direction; a clutch pin integrally provided with the second rotary body; a clutch receiving member comprising a plurality of recessed pockets to which the clutch pin enters according to a slide of the second rotary body; wherein the plurality of pockets comprise; a hoisting-side pocket in which a magnetic member is arranged; a lowering-side pocket in which a magnetic member is arranged; and an intermediate pocket which exists between the hoisting-side pocket and the lowering-side (Continued)

pocket and which the clutch pin enters in a state of not being magnetically attracted.

6 Claims, 11 Drawing Sheets

(51) Int. Cl.
    *B66D 1/22*         (2006.01)
    *F16D 11/14*       (2006.01)
    *F16D 27/14*       (2006.01)
    *F16D 43/202*     (2006.01)
    *F16H 55/17*       (2006.01)

(52) U.S. Cl.
    CPC .......... *F16D 27/14* (2013.01); *F16D 43/2024* (2013.01); *F16H 2055/176* (2013.01)

(56) References Cited

FOREIGN PATENT DOCUMENTS

| | | |
|---|---|---|
| JP | 2004347027 A | 12/2004 |
| JP | 2009052619 A | 3/2009 |
| JP | 5231498 B2 | 7/2013 |
| JP | 5342524 B2 | 11/2013 |
| JP | 5529689 B2 | 6/2014 |

OTHER PUBLICATIONS

CNIPA First Office Action for corresponding CN Application No. 201780069506.6; dated Jun. 30, 2020.

CHAIN BLOCK

CROSS REFERENCE TO RELATED APPLICATIONS

This is a U.S. national stage of application No. PCT/JP2017/047184, filed on Dec. 28, 2017. Priority under 35 U.S.C. § 119(a) and 35 U.S.C. § 365(b) is claimed from Japanese Patent Applications No. 2017-079909 filed on Apr. 13, 2017, the disclosure of which is also incorporated herein by reference.

TECHNICAL FIELD

The present invention relates to a chain block used for a work of discharging a cargo.

BACKGROUND ART

To move a cargo in the vertical direction, a manual chain block is widely used. Examples of the chain block include those disclosed in Patent Literatures 1 to 3. The chain blocks disclosed in Patent Literatures 1 to 3 each include a magnetic clutch device. At a low-load and high-speed rotation, a magnetic coupling is established in which a tooth-shaped part of a magnetic pole rotary body and a tooth-shaped part of a yoke rotary body closely face each other, and they synchronously rotate to transmit rotation torque.

On the other hand, in the case of a high load exceeding a predetermined load, the synchronous rotation by the magnetic coupling of the tooth-shaped part of the magnetic pole rotary body and the tooth-shaped part of the yoke rotary body is not kept any longer, and they slip. Then, an output rotation means integral with the magnetic pole rotary body slides in an axial direction. Then, by the slide, a clutch projection integral with the output rotation means fits in an engaging recess part of a high torque input means. In this manner, it is enabled to perform switching between a low-load and high-speed rotation mode and a high-load and low-speed rotation mode.

CITATION LIST

Patent Literature

[PTL 1] Japanese Patent No. 5342524
[PTL 2] Japanese Patent No. 5231498
[PTL 3] Japanese Patent No. 5529689

SUMMARY OF INVENTION

Technical Problem

Incidentally, in the case of manually operating the chain block to perform hoisting of moving up the cargo by winding up a load chain and to perform lowing of moving down the cargo by sending out the load chain, the lowering operation and the hoisting operation are not always performed at a constant speed and load at all times. In other words, in terms of repeating the operations of gripping an upper portion of a hand chain and sending the hand chain downward and changing a holding position so as to grip an upper portion of the hand chain and sending the hand chain downward, a large load intermittently acts in the above-explained lowering operation and hoisting operation.

Accordingly, even if the clutch projection enters the engaging recess part at the high load acting when the hand chain is sent downward, the clutch projection immediately comes out of the engaging recess part at a low load time when changing the holding position of the hand chain. Therefore, the clutch projection frequently comes out and gets into the engaging recess part, thereby causing mechanical noise.

To prevent the occurrence of the noise, in the configuration disclosed in Patent Literature 1, a clutch holding magnetic body is attached to the engaging recess part to form a configuration in which the clutch projection is magnetically held by the clutch holding magnetic body. Note that in the configuration disclosed in Patent Literature 1, the clutch holding magnetic body is attached not only to the engaging recess part on the hoisting side where the high load acts but also to the engaging recess part on the lowering side as illustrated, for example, FIG. 7, whereby the clutch projection is magnetically held by the clutch holding magnetic bodies at both the hoisting operation and the lowering operation.

However, when the load is light, the hand chain can be operated with the low-load and high-speed rotation mode switched from the high-load and low-speed rotation mode. In the configuration disclosed in Patent Literature 1, an inclined surface for detachment is provided between a pair of engaging recess parts so as to perform such mode switching. In this case, by rotating a high torque input means to the side opposite to the rotation direction until then, the clutch projection moves to the inclined surface for detachment.

Here, if the tooth-shaped part of the magnetic pole rotary body and the tooth-shaped part of the yoke rotary body are located at the same angular position in the circumferential direction, the magnetic force acting between the tooth-shaped parts slides an output rotary body (magnetic pole rotary body), so that the clutch projection comes out of the engaging recess part. This enables switching from the low-speed rotation mode to the high-speed rotation mode. However, in a slipping state where the rotations of the magnetic pole rotary body and the yoke rotary body are not synchronized, the tooth-shaped part of the magnetic pole rotary body and the tooth-shaped part of the yoke rotary body are often not located at the same angular position in the circumferential direction, and even if they are located at the same angular position, this situation is instantaneous.

Accordingly, even if the clutch projection moves along the inclined surface for detachment, the clutch projection is magnetically attracted to the clutch holding magnetic body of the engaging recess part on the opposite side across the inclined surface for detachment. Therefore, there arises a problem of failing the switching the low-speed rotation mode to the high-speed rotation mode.

The present invention has been made in consideration of the above circumstances, and its object is to provide a chain block capable of easily performing switching from a low-speed rotation mode to a high-speed rotation mode.

Solution to Problem

In order to solve the above problem, according to a first aspect of the present invention, there is provided a chain block capable of moving up and down a cargo accompanying a hoisting operation and a lowering operation, the chain block including: a gear mechanism configured to transmit, in a speed-increasing state, drive from a handwheel to a first rotary body; the first rotary body to which rotation from the gear mechanism is transmitted in a high-speed rotation mode, and in which a first tooth part formed of a magnetic material and constituting a magnetic clutch mechanism is arranged in a circumferential direction; a second rotary body including a second tooth part formed of a magnetic material, capable of transmitting, at a first position, rotation torque of prescribed torque or more by magnetic attraction force to/from the first tooth part, and constituting the magnetic clutch mechanism, in which the rotation torque by the magnetic attraction force to/from the first tooth part is smaller than the prescribed torque at a second position slid from the first position in a thrust direction perpendicular to a rotation direction; a magnet provided at least one of the first rotary body and the second rotary body; a clutch pin integrally provided with the second rotary body and formed of a magnetic material; and a clutch receiving member formed of a non-magnetic material, and including a plurality of recessed pockets configured to realize mechanical coupling by entrance of the clutch pin according to a slide of the second rotary body, wherein the plurality of pockets include: a hoisting-side pocket which the clutch pin enters at the hoisting operation and in which a magnetic member to which the clutch pin is magnetically attracted is arranged; a lowering-side pocket which the clutch pin enters at the lowering operation and in which a magnetic member to which the clutch pin is magnetically attracted is arranged; and an intermediate pocket which exists between the hoisting-side pocket and the lowering-side pocket and which the clutch pin enters in a state of not being magnetically attracted.

Further, in another aspect of the present invention, it is preferable in the above-described invention that: a first inclined surface inclining from an inside of the hoisting-side pocket toward a surface of the clutch receiving member as the first inclined surface goes from the hoisting-side pocket to the intermediate pocket is provided between the hoisting-side pocket and the intermediate pocket; a second inclined surface inclining from an inside of the lowering-side pocket toward the surface of the clutch receiving member as the second inclined surface goes from the lowering-side pocket to the intermediate pocket is provided between the lowering-side pocket and the intermediate pocket; and the first inclined surface is provided to have a small inclination angle with respect to the surface of the clutch receiving member as compared with the second inclined surface.

Further, in another aspect of the present invention, it is preferable in the above-described invention that at both end portions in the circumferential direction of the intermediate pocket, locking walls to which the clutch pin is locked are provided, and the clutch pin is locked to the locking wall in a state in which the clutch pin is prevented from coming out of the intermediate pocket in rotation of the clutch receiving member.

Further, in another aspect of the present invention, it is preferable in the above-described invention that: an outer peripheral protruding part in a circular ring shape formed of a magnetic material is arranged adjacent to the first tooth part; and the intermediate pocket has a depth at a degree at which the outer peripheral protruding part and the second tooth part magnetically couple with each other.

According to the present invention, it is possible to easily perform switching from a low-speed rotation mode to a high-speed rotation mode in a chain block.

DESCRIPTION OF EMBODIMENTS

Hereinafter, a chain block 10 according to an embodiment of the present invention will be explained based on the drawings. Note that in the following explanation, a right side in FIG. 1 is an X1 side (one side) and a left side is an X2 side (another side), and a side where a hand chain C1 is hung from a handwheel 20 is a Z2 side (lower side) and an opposite side thereto is a Z1 side (upper side).

<Regarding the Configuration of the Chain Block>

Figure 1:
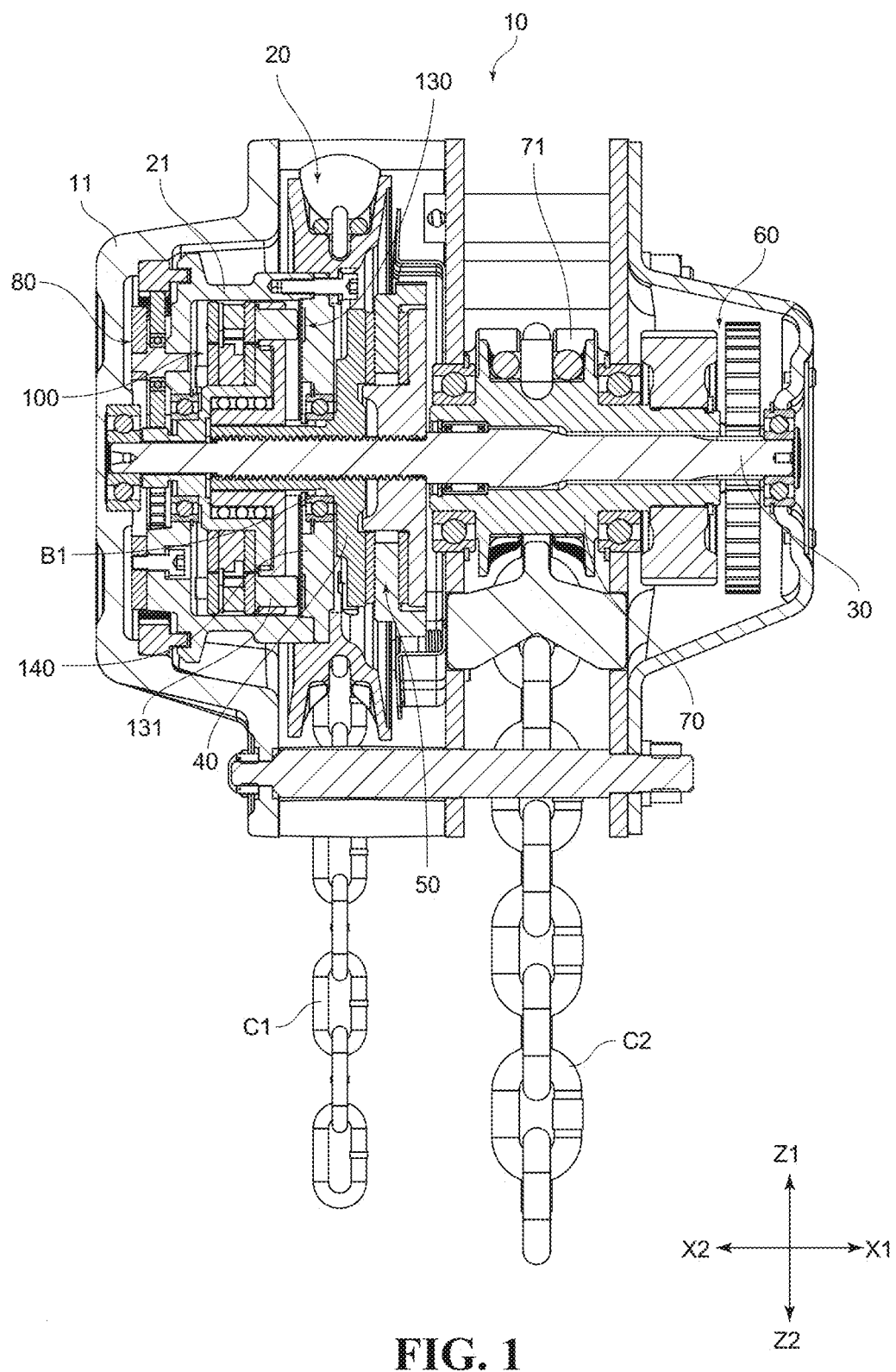
FIG. 1 is a sectional side view illustrating the configuration of a chain block according to a first embodiment of the present invention.

FIG. 1 is a sectional side view illustrating the configuration of the chain block 10. The chain block 10 is suspended from a predetermined part of a ceiling or the like via a not-illustrated upper hook. The chain block 10 includes, as illustrated in FIG. 1, the handwheel 20 around which the hand chain C1 is wound, and the handwheel 20 is provided to be rotatable on an outer peripheral side of a drive shaft 30. The drive in rotating the handwheel 20 is transmitted through a female screw member 40 to a brake mechanism 50.

The driving force transmitted from the handwheel 20 to the female screw member 40 can be switched over between a high-speed rotation mode in which the driving force is transmitted by way of a planetary gear mechanism 80 and a magnetic clutch mechanism and a low-speed rotation mode in which the rotation of the handwheel 20 is transmitted to the female screw member 40 in a direct coupling state not by way of the planetary gear mechanism 80 and the magnetic clutch mechanism.

Further, the driving force transmitted to the above-explained brake mechanism 50 is transmitted from the drive shaft 30 via a reduction gear mechanism 60 to a load sheave hollow shaft 70 located on the outer peripheral side of the drive shaft 30. In a chain pocket 71 of the load sheave hollow shaft 70, a load chain C2 is fitted, and a not-illustrated lower hook is coupled to a lower end side of the load chain C2. When the handwheel 20 is rotated in a hoisting direction, the load chain C2 is wound up, whereby the cargo suspended from the lower hook is moved up. On the other hand, when the handwheel 20 is rotated in a lowering direction, the load chain C2 is supplied, whereby the cargo suspended from the lower hook is moved down. The above is the schematic whole configuration of the chain block 10.

<Regarding the Configuration Near the Planetary Gear Mechanism>

First, the configuration near the planetary gear mechanism 80 will be explained. Note that the planetary gear mechanism 80 corresponds to a gear mechanism. As illustrated in FIG. 1, the handwheel 20 is integrally provided with a cylindrical member 21 in a cylindrical shape. The cylindrical member 21 is a portion covering a later-explained magnetic clutch mechanism 100.

Figure 2:
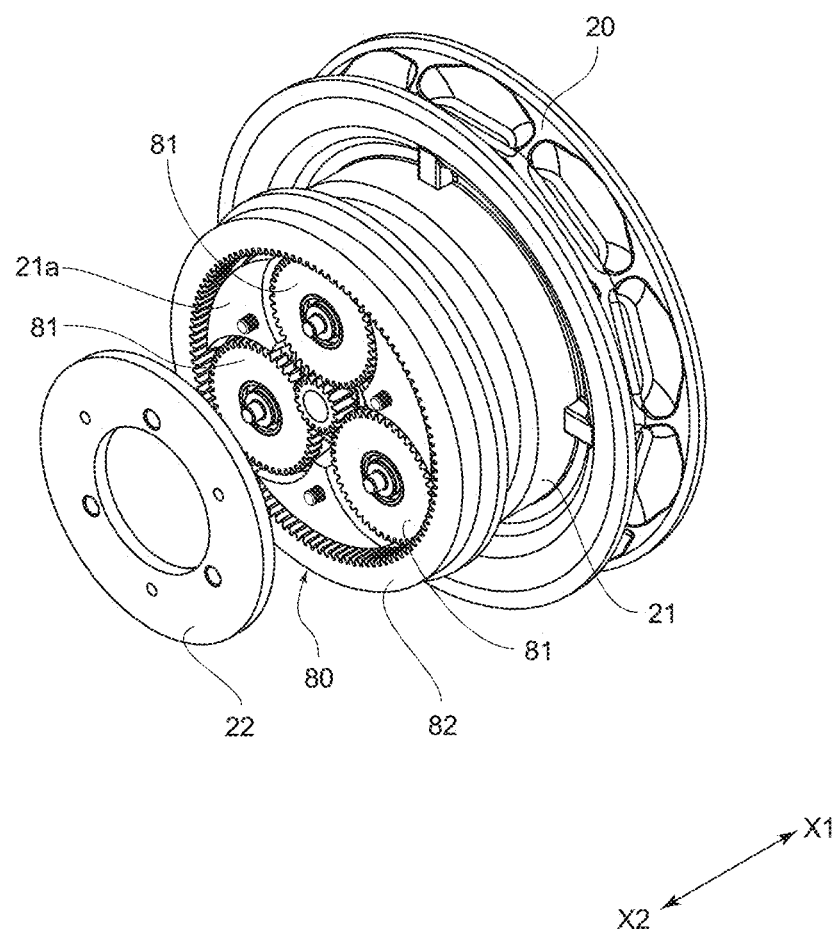
FIG. 2 is a perspective view illustrating the configurations of a handwheel and a planetary gear mechanism in the chain block in FIG. 1, and is a view illustrating a state in which a pivot support plate is detached from a bottom support part of a cylindrical member.

FIG. 2 is a perspective view illustrating the configurations of the handwheel 20 and the planetary gear mechanism 80, and is a view illustrating a state in which a pivot support plate 22 is detached from a bottom support part 21a of the cylindrical member 21. As illustrated in FIG. 2, on the bottom support part 21a of the cylindrical member 21, one end side of a rotary shaft of a planetary gear 81 constituting the planetary gear mechanism 80 is rotatably supported. Further, to the bottom support part 21a, the pivot support plate 22 is attached with a predetermined space therefrom. The pivot support plate 22 rotatably supports another end side of the rotary shaft of the planetary gear 81.

Further, as illustrated in FIG. 1 and FIG. 2, on a side portion of the cylindrical member 21, the planetary gear mechanism 80 is arranged. The planetary gear mechanism 80 transmits, in a speed-increasing state, the rotation of the handwheel 20 and the cylindrical member 21 to an inside yoke rotary body 110. Note that the planetary gear mechanism 80 includes a sun gear part 112 (see FIG. 3) provided on the other side (X2 side) of an axial direction (X-direction; a thrust direction) of the inside yoke rotary body 110, a plurality of (three in FIG. 2) planetary gears 81 arranged around the sun gear part 112 and meshing with the sun gear part 112, and a ring gear 82 fixed to a wheel cover 11 and meshing with the planetary gears 81 on an outer radial side away from the sun gear part 112. Further, the ring gear 82 fixed to the wheel cover 11 and the cylindrical member 21 are provided to be slidable in a circumferential direction at a portion where they face each other. With this configuration, the one end of the cylindrical member 21 is rotatably supported by the wheel cover 11 via the ring gear 82. Further, the bottom support part 21a of the cylindrical member 21 and the pivot support plate 22, which rotatably support the planetary gears 81, are rotatably supported to be rotatable together with the handwheel 20 by the same axial core with the central axis of the ring gear 82.

Figure 3:
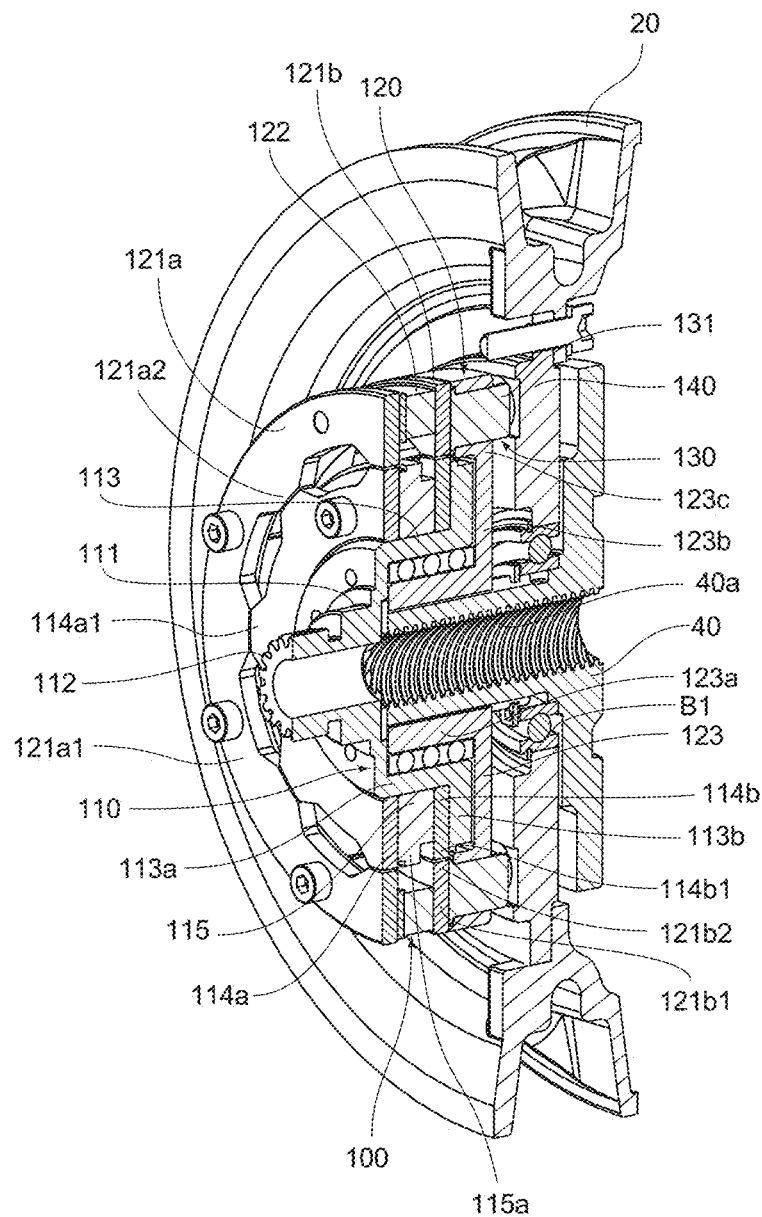
FIG. 3 is a perspective view illustrating a half-sectional state of the configuration near a magnetic clutch mechanism and the handwheel in the chain block in FIG. 1.
Figure 4:
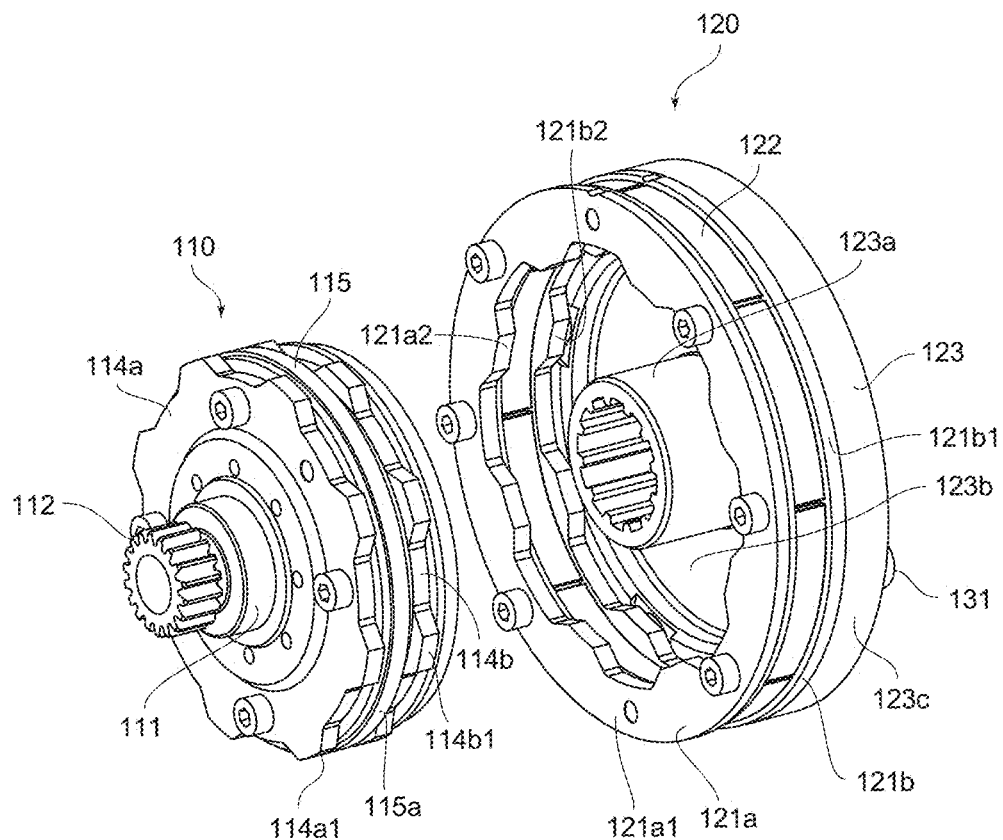
FIG. 4 is a perspective view of a state in which positions of an inside yoke rotary body and an outside yoke rotary body constituting the magnetic clutch mechanism in the chain block in FIG. 1 are shifted.

When the handwheel 20 is rotated in the high-speed rotation mode, its driving force is increased in speed by the planetary gear mechanism 80, and transmitted in the increased-speed state to a geared hub 111 having the sun gear part 112 (see FIG. 3 and FIG. 4). In this event, for example, the ring gear 82 is fixed and the planetary gears 81 revolve (rotate around the sun gear part 112) to rotate the sun gear part 112 in an increased-speed manner. On the other hand, in a state switched to the low-speed rotation mode, the inside yoke rotary body 110 is freely rotatable. Accordingly, in the state where later-explained clutch pins 131 (see FIG. 5 and so on) are not fitted into pockets 141, 142 (see FIG. 7 and so on), the inside yoke rotary body 110 is configured to freely rotate so that later-explained external-tooth parts 114a1 and internal-tooth parts 121a2 are located to face each other.

<Regarding the Configuration Near the Magnetic Clutch Mechanism>

Figure 5:
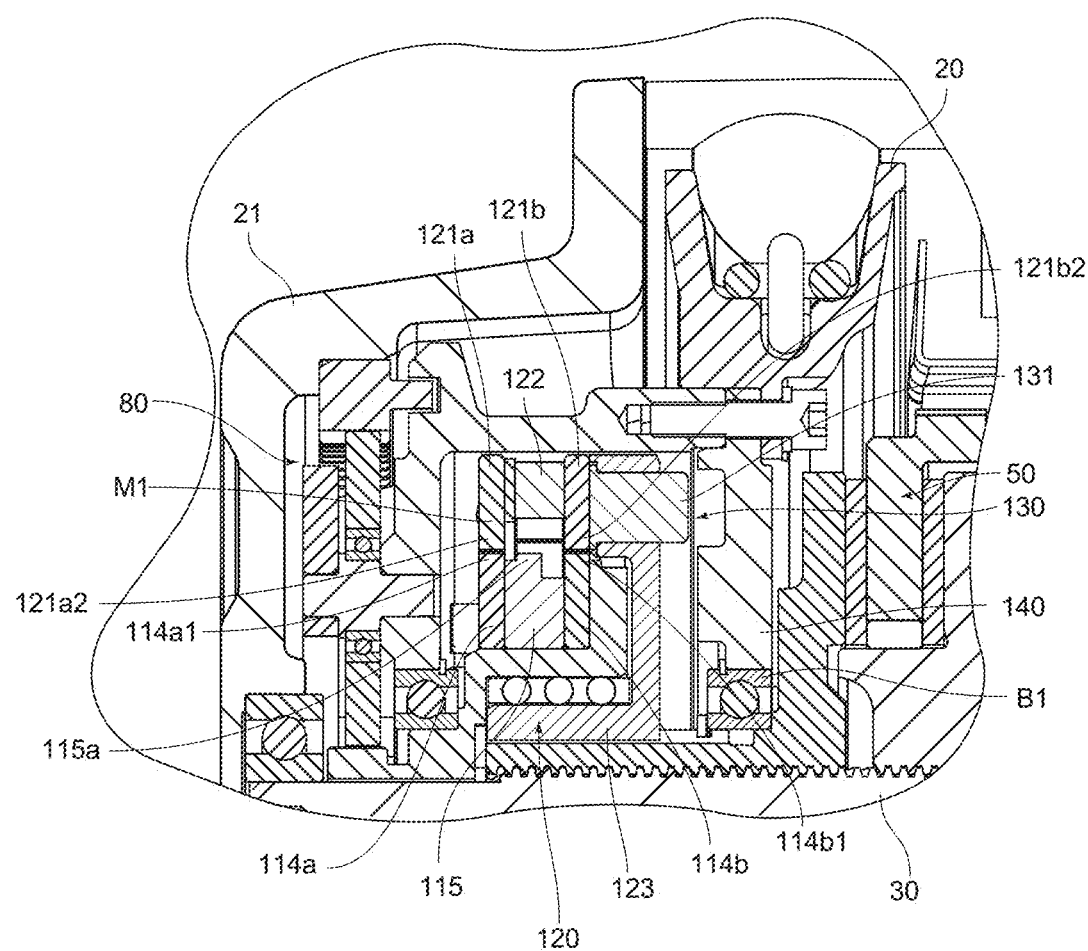
FIG. 5 is a sectional side view illustrating an enlarged configuration near the magnetic clutch mechanism in the chain block in FIG. 1.
Figure 6:
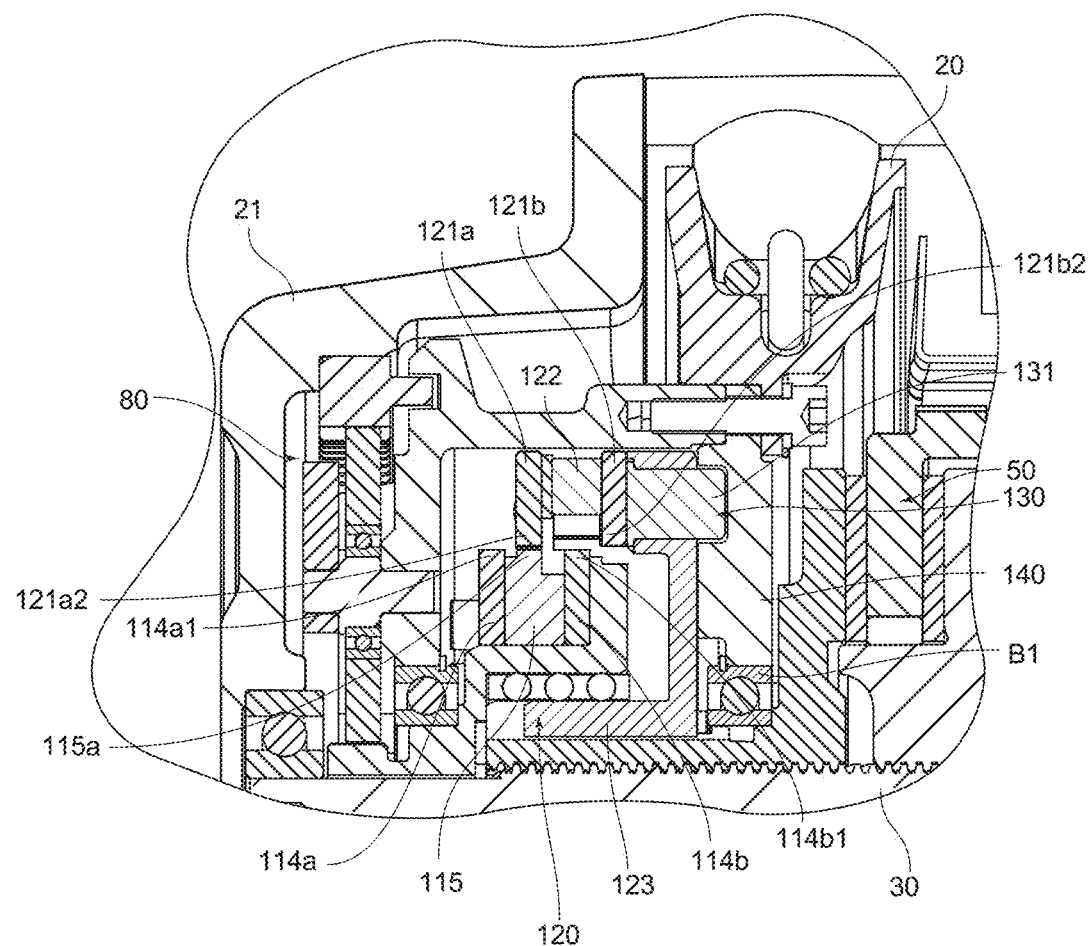
FIG. 6 is a sectional side view illustrating a state in which an outside yoke rotary body is slid in one direction (X1 side) from the state illustrated in FIG. 5.

FIG. 3 is a perspective view illustrating a half-sectional state of the configuration near the magnetic clutch mechanism 100 and the handwheel 20. FIG. 4 is a perspective view of a state in which the positions of the inside yoke rotary body 110 and an outside yoke rotary body 120, which constitute the magnetic clutch mechanism 100, are detached each other. FIG. 5 is a sectional view illustrating an enlarged configuration near the magnetic clutch mechanism 100. FIG. 6 is a sectional side view illustrating a state in which the outside yoke rotary body 120 is slid in one direction (X1 side) from the state illustrated in FIG. 5.

As illustrated in FIG. 3 and FIG. 4, the magnetic clutch mechanism 100 has the inside yoke rotary body 110 and the outside yoke rotary body 120 as main components. Note that the inside yoke rotary body 110 corresponds to a first rotary body, and the outside yoke rotary body 120 corresponds to a second rotary body.

The inside yoke rotary body 110 has the geared hub 111, a pair of external-tooth yokes 114a, 114b, and a ring yoke 115. The geared hub 111 is a member in which the sun gear part 112 and a hub part 113 are integrally provided. The sun gear part 112 meshes with the above-explained planetary gears 81 to be able to transmit the rotation from the planetary gears 81. Further, the hub part 113 has a cylindrical part 113a and a flange part 113b, and the above-explained pair of external-tooth yokes 114a, 114b and the ring yoke 115 are attached to the flange part 113b via, for example, a screw or the like on the outer peripheral side of the cylindrical part 113e. Thus, the geared hub 111, the pair of external-tooth yokes 114a, 114b, and the ring yoke 115 are configured to integrally rotate.

The pair of external-tooth yokes 114a, 114b and the ring yoke 115 are to amplitude the attraction force by the magnetic force, and are formed of a magnetic material. The pair of external-tooth yokes 114a, 114b of them are provided with external-tooth parts 114a1, 114b1 at regular intervals, and the external-tooth parts 114a1, 114b1 protrude to the outer peripheral side further than annular parts 114a2, 114b2. Note that the external-tooth part 114a1 corresponds to a first tooth part, but both of the external-tooth part 114a1 and the external-tooth part 114b1 may correspond to the first tooth part.

In the configuration illustrated in FIG. 3 and FIG. 4, the external-tooth part 114a1 of the external-tooth yoke 114a and the external-tooth part 114b1 of the external-tooth yoke 114b are provided at the same angular position in the circumferential direction. However, these external-tooth parts 114a1, 114b1 may exist at slightly different angular positions. Further, in FIG. 4, the external-tooth parts 114a1, 114b1 are provided eight each. However, the numbers of the external-tooth parts 114a1, 114b1 may be any numbers.

Further, the ring yoke 115 is arranged between the pair of external-tooth yokes 114a and 114b. In the ring yoke 115, an outer peripheral protruding part 115a exists which protrudes to the outer diameter side further than the ring-shaped portion, and the outer peripheral protruding part 115a is also provided in a ring shape without a break. Note that the outer peripheral protruding part 115a is provided to be closer to the external-tooth yoke 114a than to the external-tooth yoke 114b in the axial direction (X-direction). Accordingly, the outer peripheral protruding part 115a can face a later-explained internal-tooth part 121a2.

Next, the outside yoke rotary body 120 will be explained. As illustrated in FIG. 3 and FIG. 4, the outside yoke rotary body 120 has a pair of internal-tooth yokes 121a, 121b, a plurality of magnets 122, a sliding wheel 123 (also serving as a component of a engagement clutch mechanism 130 (see FIG. 4 and FIG. 6)), and the clutch pins 131 (components of the engagement clutch mechanism 130). Note that the pair of internal-tooth yokes 121a, 121b, the plurality of magnets 122, and the clutch pins 131 are attached to an outer peripheral fixing part 123c of the sliding wheel 123.

The pair of internal-tooth yokes 121a, 121b are formed of a magnetic material, and have circular ring parts 121a1, 121b1 in a ring shape, and internal-tooth parts 121a2, 121b2 protruding to the inner diameter side from the circular ring parts 121a1, 121b1. The internal-tooth parts 121a2, 121b2 are provided at the same pitch and in the same number as those of the external-tooth parts 114a1, 114b1, and both of them are provided to closely face each other. However, as long as torque transmission by magnetic coupling can be successfully performed, the numbers of them may slightly increase or decrease from the same number due to lack of any of the internal-tooth parts 121a2, 121b2 and the external-tooth parts 114a1, 114b1 or the like. Note that the internal-tooth part 121a2 corresponds to a second tooth part, but both of the internal-tooth part 121a2 and the internal-tooth part 121b2 may correspond to the second tooth part.

Further, between the internal-tooth yoke 121a and the internal-tooth yoke 121b, the plurality of magnets 122 having magnetic force are arranged. In this embodiment, one magnet 122 is arranged for one set of the internal-tooth yokes 121a, 121b. Thus, a magnetic circuit M1 for each set of internal-tooth yokes 121a, 121b can be easily formed. Note that in place of the configuration including the plurality of magnets 122, a configuration including one ring-shaped magnet may be employed.

Here, in the high-speed rotation mode, the above-explained internal-tooth parts 121a2 come into a magnetic coupling state of closely facing the external-tooth parts 114a1, and the internal-tooth parts 121b2 similarly come into a magnetic coupling state of closely facing the external-tooth parts 114b1. Further, the position in the axial direction (X-direction) of the outside yoke rotary body 120 in the high-speed rotation mode corresponds to a first position. In this event, as illustrated in FIG. 5, the magnetic circuit M1 passing through the magnet 122, the internal-tooth yoke 121a, the external-tooth yoke 114a, the ring yoke 115, the external-tooth yoke 114b, and the internal-tooth yoke 121b is formed. In the magnetic coupling state in which the magnetic circuit M1 is formed, rotation can be transmitted from the external-tooth yokes 114a, 114b (the inside yoke rotary body 110) to the internal-tooth yokes 121a, 121b (the outside yoke rotary body 120).

However, if an overload acts, the internal-tooth parts 121a2, 121b2 cannot keep any longer the magnetic coupling state with the external-tooth parts 114a1, 114b1 respectively, results in that the external-tooth parts 114a1, 114b1 slip with respect to the internal-tooth parts 121a2, 121b2. In other words, the external-tooth parts 114a1, 114b1 deviate in the circumferential direction from the internal-tooth parts 121a2, 121b2. In this event, the magnetic body of the inside yoke rotary body 110 closest in distance to the internal-tooth yoke 121a is the ring yoke 115. Therefore, as illustrated in FIG. 6, the outside yoke rotary body 120 is slid to be directed to one side (X1 side) in the axial direction (X-direction) so that the internal-tooth yoke 121a (the internal-tooth part 121a2) and the outer peripheral protruding part 115a closely face each other. Note that the position in the axial direction (X-direction) where the internal-tooth yoke 121a (the internal-tooth part 121a2) and the outer peripheral protruding part 115a closely face each other as illustrated in FIG. 6 corresponds to a second position.

The sliding wheel 123 also has a tubular part 123a, a disk part 123b, and the outer peripheral fixing part 123c. The tubular part 123a is spline-coupled therein to a tubular part 40a of the female screw member 40. Therefore, the sliding wheel 123 is slidable along the axial direction (X-direction). The disk part 123b is a disk-shaped portion located between the tubular part 123a and the outer peripheral fixing part 123c. Further, the outer peripheral fixing part 123c is a portion located on the outermost diameter side of the sliding wheel 123, and is a portion protruding the other side (X2 side) in the axial direction (X-direction) further than the disk part 123b. To the outer peripheral fixing part 123c, the above-explained pair of internal-tooth yokes 121a, 121b, the plurality of magnets 122, and the clutch pins 131 are fixed. Note that the sliding wheel 123 also serves as the component of the engagement clutch mechanism 130.

<Regarding the Configuration of the Engagement Clutch Mechanism>

Figure 7:
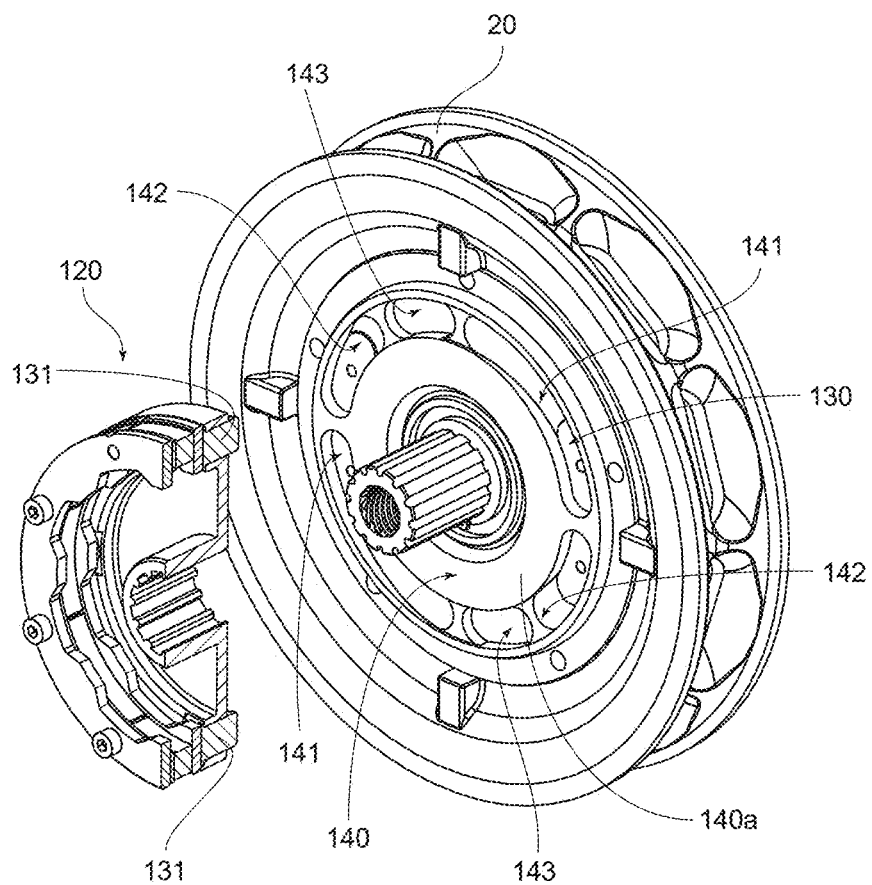
FIG. 7 is a perspective view for explaining an engagement clutch mechanism in the chain block in FIG. 1, and is a view illustrating the outside yoke rotary body in a half section.

Next, the engagement clutch mechanism 130 will be explained. FIG. 7 is a perspective view for explaining the engagement clutch mechanism 130, and is a view illustrating the outside yoke rotary body 120 in a half section. The engagement clutch mechanism 130 includes the clutch pins 131 and a clutch receiving member 140. The clutch pins 131 are pin-shaped portions protruding to the one side (X1 side) in the axial direction (X-direction) further than the disk part 123b of the sliding wheel 123, and are formed of a magnetic material. Accordingly, the clutch pins 131 are magnetically attracted to later-explained magnetic plates 144 by the magnetic force of the magnets 122.

The clutch pins 131 are portions entering pockets 141, 142, 143 of the clutch receiving member 140. When the clutch pins 131 enter the pockets 141, 142, 143, the rotation of the handwheel 20 is transmitted from the clutch receiving member 140 to the sliding wheel 123 of the outside yoke rotary body 120 via the clutch pins 131 not by way of the planetary gear mechanism 80 and the magnetic clutch mechanism 100. Then, the rotation is transmitted to the female screw member 40 via the tubular part 123a. In this embodiment, two clutch pins 131 are provided, but the number of the clutch pins 131 is not particularly limited.

As illustrated in FIG. 7, on the outer peripheral side of the clutch receiving member 140, the handwheel 20 is integrally attached. Further, the clutch receiving member 140 is rotatably attached to the outer peripheral side of the female screw member 40 via a bearing B1.

As illustrated in FIG. 7, the clutch receiving member 140 is provided in a disk shape. The clutch receiving member 140 is provided to be thin on its outermost peripheral side and is thereby an outer peripheral flange part 140b recessed from a disk surface 140a (see FIG. 9). To the outer peripheral flange part 140b, the above-explained cylindrical member 21 is attached.

Figure 8:
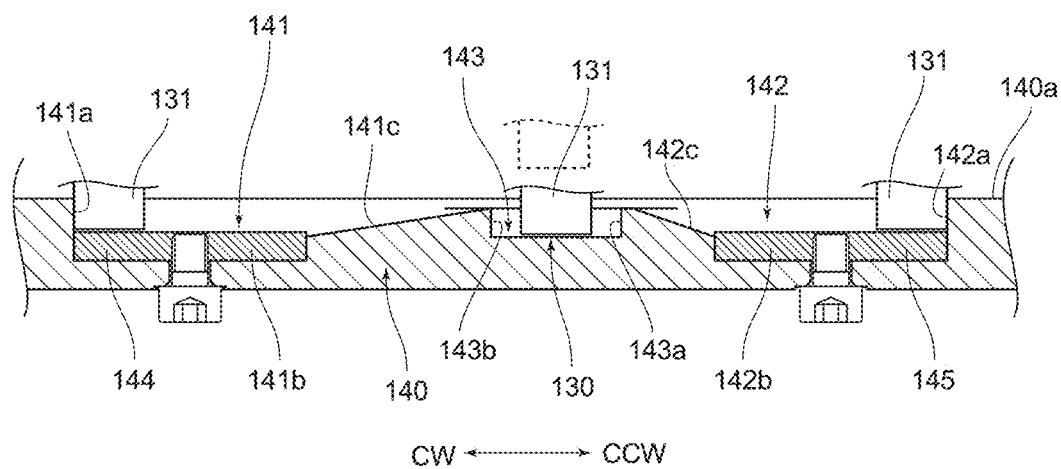
FIG. 8 is a sectional view illustrating a state of a plurality of pockets of a clutch receiving member in the chain block in FIG. 1 cut along the circumferential direction.
Figure 9:
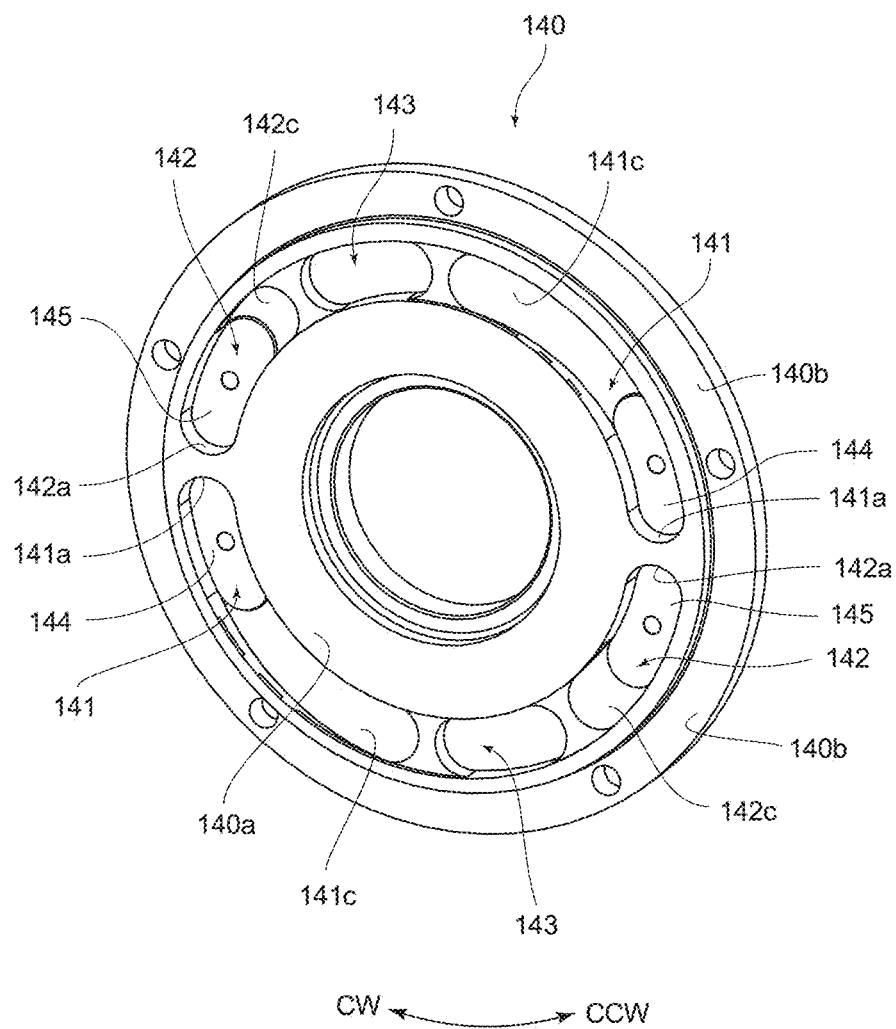
FIG. 9 is a perspective view illustrating the configuration of the clutch receiving member in the chain block in FIG. 1.

The clutch receiving member 140 is provided with the plurality of pockets 141, 142, 143 recessed from the disk surface 140a which is a surface on the other side (X2 side) in the axial direction (X-direction). FIG. 8 is a sectional view illustrating a state of the plurality of pockets 141, 142, 143 cut along the circumferential direction. FIG. 9 is a perspective view illustrating the configuration of the clutch receiving member 140. As illustrated in FIG. 8 and FIG. 9, a hoisting-side pockets 141 are portions which the clutch pins 131 enter when the load chain C2 is hoisted. At the hoisting operation, the clutch receiving member 140 rotates together with the handwheel 20, and the rotation direction is counterclockwise (CCW direction) when viewing the clutch receiving member 140 from a direction in which the plurality of pockets 141, 142, 143 are viewed. In this event, the clutch pins 131 are locked to locking walls 141a (vertical to the disk surface 140a) along the axial direction (X-direction). Thus, the rotation is transmitted from the clutch pins 131 to the clutch receiving member 140.

Further, inside the hoisting-side pockets 141, the magnetic plates 144 (corresponding to magnetic members) formed of the magnetic material are arranged. As illustrated in FIG. 8, the magnetic plate 144 is fixed in a state of being fitted into a recessed fitting part 141b of the hoisting-side pocket 141. The magnetic plate 144 is provided to continue to a first tapered surface 141c on the side opposite to the locking wall 141a of the hoisting-side pocket 141.

The first tapered surface 141c is an inclined surface located between the magnetic plate 144 and a intermediate pocket 143, and inclines toward the disk surface 140a as it goes from the magnetic plate 144 to the intermediate pocket 143.

Further, a lowering-side pockets 142 are portions which the clutch pins 131 enter when the load chain C2 is lowered. More specifically, the lowering-side pockets 142 area portions which the clutch pins 131 enter when the load chain C2 is rotated in a direction opposite to that when the load chain C2 is hoisted. At the lowering operation, the clutch receiving member 140 rotates together with the handwheel 20, and the rotation direction is clockwise (CW direction) opposite to the above-explained counterclockwise (CCW direction). In this event, the clutch pins 131 are locked to locking walls 142a (vertical to the disk surface 140a) along the axial direction (X-direction). Thus, the rotation is transmitted from the clutch pins 131 to the clutch receiving member 140.

Also inside the lowering-side pockets 142, magnetic plates 145 (corresponding to magnetic members) formed of the magnetic material are arranged. The magnetic plate 145 is fixed in a state of being fitted into a recessed fitting part 142b of the lowering-side pocket 142. Further, the magnetic plate 145 is provided to continue to a second tapered surface 142c on the side opposite to the locking wall 142a of the lowering-side pocket 142. Note that the clutch pin 131 is magnetically attracted by the magnetic plate 144, 145, and between the clutch pin 131 and the magnetic plate 144, 145, a slight gap preferably exists. When the slight gap exists, the friction between the clutch pin 131 and the magnetic plate 144, 145 is reduced.

The second tapered surface 142c is an inclined surface located between the magnetic plate 144 and the intermediate pocket 143, and inclines toward the disk surface 140a as it goes from the magnetic plate 145 to the intermediate pocket 143. However, as is clear from FIG. 8, the second tapered surface 142c is provided to be larger in inclination angle than the first tapered surface 141c. In other words, the first tapered surface 141c is provided to have a gentler inclination angle than that of the second tapered surface 142c.

More specifically, if the inclination angle of the first tapered surface 141c is steep, when the handwheel 20 is rotated in the lowering direction from the hoisting state, the clutch pin 131 bumps into the first tapered surface 141c by the rotation in the lowering direction (CW direction) of the clutch receiving member 140, but the clutch pin 131 does not successively slide on the first tapered surface 141c. In order to prevent such an inappropriate condition, the inclination angle of the first tapered surface 141c is provided to be smaller than that of the second tapered surface 142c.

Note that in the configuration illustrated in FIG. 8, the first tapered surface 141c is inclined so that a projected length in the circumferential direction of the first tapered surface 141c is equal to or more than twice a projected length in the circumferential direction of the second tapered surface 142c. However, as long as the clutch pin 131 is capable of successively sliding on the first tapered surface 141c (capable of preventing co-rotation of the clutch receiving member 140 and the clutch pin 131) when the clutch receiving member 140 is rotated in the lowering direction (CW direction), the inclination angle may be any angle.

Further, between the hoisting-side pocket 141 and the lowering-side pocket 142, the intermediate pocket 143 is provided. The intermediate pocket 143 is a portion provided to perform switching from the low-speed rotation mode to the high-speed rotation mode. The necessity of the intermediate pocket 143 will be explained based on FIG. 10.

Figure 10:
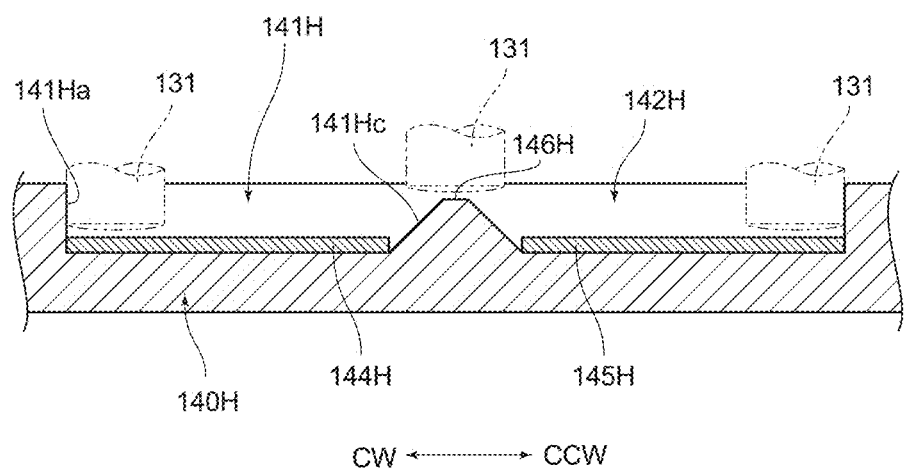
FIG. 10 is a sectional view illustrating a state of a plurality of pockets cut along a circumferential direction in a conventional configuration.

FIG. 10 is a sectional view illustrating a state of a plurality of pockets 141H, 142H, cut along the circumferential direction in the conventional configuration as illustrated in FIG. 7 of Patent Literature 1. In the configuration illustrated in FIG. 10, a sign H is given to a configuration relating to a clutch receiving member 140H in the conventional configuration. Note that in the configuration illustrated in FIG. 10, the configuration corresponding to the intermediate pocket 143 does not exist. In the configuration illustrated in FIG. 10, when the clutch pin 131 enters a hoisting-side pocket 141H to rotate the handwheel 20 and the clutch receiving member 140 in the hoisting direction (CCW direction), a direct coupling state is established in which the rotation of the handwheel 20 is transmitted from the clutch receiving member 140H to the sliding wheel 123 of the outside yoke rotary body 120 via the clutch pin 131. In this event, the clutch pin 131 is in a state of being magnetically attracted by a magnetic plate 144H.

For releasing the magnetic attraction of the clutch pin 131 by the magnetic plate 144H, the handwheel 20 and the clutch receiving member 140H are rotated in the opposite direction (CW direction) to the hoisting direction. Then, the clutch pin 131 slides on a tapered surface 141Hc and climbs over an intermediate projection 146H, and in this event, the outside yoke rotary body 120 once slides to the other side (X2 side) in the axial direction (X-direction). If the clutch pin 131 does not enter a lowering-side pocket 142H to perform switching to the high-speed rotation mode even when the rotation of the handwheel 20 and the clutch receiving member 140H is continued in that state, there is no problem.

However, when the external-tooth part 114a1 of the external-tooth yoke 114a and the internal-tooth part 121a2 of the internal-tooth yoke 121a are not at the same angle in the circumferential direction, the outer peripheral protruding part 115a of the ring yoke 115 and the internal-tooth part 121a2 attract each other by the action of the magnetism so as to come into a state of facing each other. Thus, the outside yoke rotary body 120 moves again to the one side (X1 side) in the axial direction (X-direction), and the movement causes the clutch pin 131 to enter the lowering-side pocket 142H. Then, the clutch pin 131 is magnetically attracted to the magnetic plate 145.

In other words, in the configuration illustrated in FIG. 10, even when the handwheel 20 and the clutch receiving member 140H are rotated and the clutch pin 131 comes out of the hoisting-side pocket 141H, the clutch pin 131 enters again the lowering-side pocket 142H.

In contrast to the above, in this embodiment, as illustrated in FIG. 8 and FIG. 9, the intermediate pocket 143 is provided between the hoisting-side pocket 141 and the lowering-side pocket 142. The intermediate pocket 143 is a portion recessed from the disk surface 140a and the tapered surfaces 141c, 142c. Further, a locking wall 143a is provided at a counterclockwise end portion of the intermediate pocket 143, and a locking wall 143b is provided also at a clockwise end portion of the intermediate pocket 143.

Accordingly, at the time when the handwheel 20 and the clutch receiving member 140 are rotated clockwise (CW direction) and the clutch pin 131 climbs over the first tapered surface 141c, and further when the outer peripheral protruding part 115a and the internal-tooth part 121a2 attract each other so as to come into a state of facing each other, the clutch pin 131 enters the intermediate pocket 143. When the handwheel 20 and the clutch receiving member 140 are further rotated clockwise (CW direction) in that state, the clutch pin 131 is locked to the locking wall 143a, and the clutch pin 131 rotates together with the clutch receiving member 140.

However, inside the intermediate pocket 143, no magnetic plate is arranged. Accordingly, when the rotation of the handwheel 20 and the clutch receiving member 140 is stopped, the freely rotatable inside yoke rotary body 110 rotates in the circumferential direction so that the internal-tooth part 121a2 and the external-tooth part 114a1 are located to closely face each other. Then, by the action of the magnetic force between the internal-tooth part 121a2 and the external-tooth part 114a1, the outside yoke rotary body 120 is moved in the thrust direction so that the internal-tooth part 121a2 and the external-tooth part 114a1 are located to most closely face each other also in the axial direction. Thus, the clutch pin 131 can come out of the intermediate pocket 143 to perform switching to the high-speed rotation mode.

Note that when the clutch pin 131 comes out of the intermediate pocket 143 as explained above, the internal-tooth part 121a2 and the external-tooth part 114a1 closely face each other in the circumferential direction. After this, unless an overload acts to release the state in which the internal-tooth part 121a2 and the external-tooth part 114a1 closely face each other, the high-speed rotation mode is kept.

Further, in the case of an overload also in the lowering state, the clutch pin 131 enters the lowering-side pocket 142 illustrated in FIG. 8 and FIG. 9, the clutch pin 131 is locked to the locking wall 142a. When the handwheel 20 and the clutch receiving member 140 are rotated counterclockwise (CCW direction) from this state, and the clutch pin 131 climbs over the second tapered surface 142c and the outer peripheral protruding part 115a and the internal-tooth part 121a2 attract each other so as to come into a state of facing each other, the clutch pin 131 enters the intermediate pocket 143.

When the handwheel 20 and the clutch receiving member 140 are further rotated counterclockwise (CCW direction) in that state, the clutch pin 131 is locked to the locking wall 143b, and the clutch pin 131 rotates together with the clutch receiving member 140.

Also in this event, when the rotation of the handwheel 20 and the clutch receiving member 140 is stopped, the freely rotatable inside yoke rotary body 110 rotates in the circumferential direction so that the internal-tooth part 121a2 and the external-tooth part 114a1 are located to closely face each other. Then, by the action of the magnetic force between the internal-tooth part 121a2 and the external-tooth part 114a1, the outside yoke rotary body 120 is moved in the thrust direction so that the internal-tooth part 121a2 and the external-tooth part 114a1 are located to most closely face each other in the axial direction. Thus, the clutch pin 131 can come out of the intermediate pocket 143 to perform switching to the high-speed rotation mode.

Note that the intermediate pocket 143 preferably has a depth at a degree at which the outer peripheral protruding part 115a and the internal-tooth part 121a2 magnetically couple with each other. However, to make the clutch pin 131 successfully come out of the hoisting-side pocket 141, the intermediate pocket 143 may be provided at a depth which is smaller than that when the outer peripheral protruding part 115a and the internal-tooth part 121a2 magnetically couple with each other.

<Regarding Action and Effect>

In the chain block 10 having the above configuration, the hoisting-side pockets 141, which the clutch pins 131 enter at the hoisting operation and in which the magnetic plates 144 to which the clutch pins 131 are magnetically attracted are arranged, exist in the plurality of pockets existing in the clutch receiving member 140. Further, the lowering-side pockets 142, which the clutch pins 131 enter at the lowering operation and in which the magnetic plates 145 to which the clutch pins 131 are magnetically attracted are arranged, exist in the plurality of pockets. Further, the intermediate pockets 143 which the clutch pins 131 enter in a state of not being magnetically attracted exist between the hoisting-side pockets 141 and the lowering-side pockets 142.

Accordingly, when the handwheel 20 is reversely rotated from the low-speed rotation mode to perform switching to the high-speed rotation mode at the hoisting operation, it is possible to prevent the clutch pins 131 from directly entering the lowering-side pockets 142 from the hoisting-side pockets 141, and to cause the clutch pins 131 to enter the intermediate pockets 143. Since no magnetic plates are arranged in the intermediate pockets 143, the force of magnetically attracting the clutch pins 131 does not act. Accordingly, when the rotation of the handwheel 20 and the clutch receiving member 140 is stopped, the internal-tooth parts 121a2 and the external-tooth parts 114a1 are located to most closely face each other by the rotation in the circumferential direction of the freely rotatable inside yoke rotary body 110 and the movement in the thrust direction of the outside yoke rotary body 120. Thus, the clutch pins 131 can come out of the intermediate pockets 143 to perform switching to the high-speed rotation mode.

Further, in this embodiment, between the hoisting-side pocket 141 and the intermediate pocket 143, the first tapered surface 141c is provided which inclines from the inside of the hoisting-side pocket 141 toward the surface of the clutch receiving member 140 as it goes from the hoisting-side pocket 141 to the intermediate pocket 143. Further, between the lowering-side pocket 142 and the intermediate pocket 143, the second tapered surface 142c is provided which inclines from the inside of the lowering-side pocket 142 toward the disk surface 140a of the clutch receiving member 140 as it goes from the lowering-side pocket 142 to the intermediate pocket 143. Further, the first tapered surface 141c is provided to have a small inclination angle with respect to the surface of the clutch receiving member 140 as compared with the second tapered surface 142c.

Here, in the conventional configuration illustrated in FIG. 10, the load required when the handwheel 20 and the clutch receiving member 140H are rotated in the lowering direction (CW direction) from the hoisting state in which the clutch pin 131 is locked to the locking wall 141Ha is lighter than the case of rotating them in the hoisting direction (CCW direction). Although the load is light in the case, the clutch pin 131 cannot climb over the first tapered surface 141Hc when the handwheel 20 and the clutch receiving member 140 are rotated in the lowering direction, and possibly rotates in the same direction as that of the clutch receiving member 140H. In this case, the clutch pin 131 is magnetically attracted again to the magnetic plate 144H, switching to the high-speed rotation mode is not successfully performed.

However, in this embodiment, since the first tapered surface 141c is provided to have a small inclination angle with respect to the surface of the clutch receiving member 140 as compared with the second tapered surface 142c, the clutch pin 131 easily climbs over the first tapered surface 141c. Therefore, it is possible to prevent the clutch pin 131 from being magnetically attracted again to the magnetic plate 144, and to easily perform switching to the high-speed rotation mode.

Further, in this embodiment, at both end portions in the circumferential direction of the intermediate pocket 143, the locking walls 143a, 143b to which the clutch pin 131 is locked are provided. Further, at the rotation of the clutch receiving member 140, the clutch pin 131 is locked to the locking wall 143a, 143b in a state in which the clutch pin 131 is prevented from coming out of the intermediate pocket 143.

Therefore, when the clutch pin 131 moving from the hoisting-side pocket 141 enters the intermediate pocket 143, the clutch pin 131 can be prevented from moving to the lowering-side pocket 142 side. Similarly, when the clutch pin 131 moving from the lowering-side pocket 142 enters the intermediate pocket 143, the clutch pin 131 can be prevented from moving to the hoisting-side pocket 141 side. Accordingly, when the rotation of the handwheel 20 and the clutch receiving member 140 is stopped, the clutch pin 131 can get out of the lowering-side pocket 142 by the action of the magnetic force to successfully perform switching from the low-speed rotation mode to the high-speed rotation mode.

Further, in this embodiment, the outer peripheral protruding part 115a in a circular ring shape formed of the magnetic material is arranged adjacent to the external-tooth part 114a1, and the intermediate pocket 143 has a depth at a degree at which the outer peripheral protruding part 115a and the internal-tooth part 121a2 magnetically couple with each other.

Therefore, when the clutch pin 131 comes to an opening of the intermediate pocket 143, where the external-tooth part 114a1 of the external-tooth yoke 114a and the internal-tooth part 121a2 of the internal-tooth yoke 121a are not at the same degree in the circumferential direction, the outer peripheral protruding part 115a of the ring yoke 115 and the internal-tooth part 121a2 can be configured to attract each other by the action of the magnetism so as to come into a state of facing each other. Accordingly, the clutch pin 131 moving from the hoisting-side pocket 141 to enter the intermediate pocket 143 can be prevented from moving to the lowering-side pocket 142. Similarly, the clutch pin 131 moving from the lowering-side pocket 142 to enter the intermediate pocket 143 can be prevented from moving to the hoisting-side pocket 141. Therefore, when the rotation of the handwheel 20 and the clutch receiving member 140 is stopped, the clutch pin 131 can come out of the lowering-side pocket 142 by the action of the magnetic force to successfully perform switching from the low-speed rotation mode to the high-speed rotation mode.

Modification Example

The embodiment of the present invention has been explained above, but the present invention can be variously modified other than that. Hereinafter, the various modifications will be explained.

Figure 11:
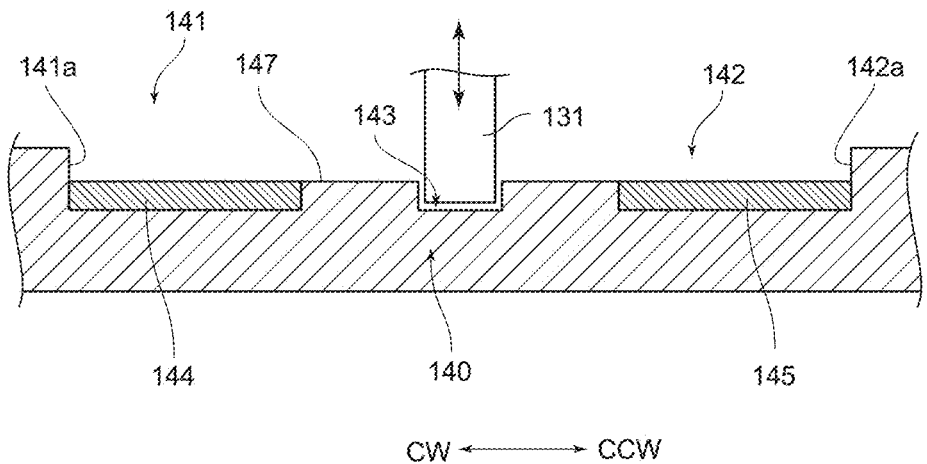
FIG. 11 is a sectional view illustrating the configuration of a clutch receiving member according to a modification example.

In the above embodiment, the clutch receiving member 140 has a sectional shape as illustrated in FIG. 8. However, the clutch receiving member 140 may be formed in shapes illustrated in FIG. 11 and FIG. 12. FIG. 11 is a sectional view illustrating the configuration of a clutch receiving member 140 according to a modification example. In the configuration illustrated in FIG. 11, the surface of the hoisting-side pocket 141 and the surface of the lowering-side pocket 142 are located at the same plane (bottom surface 147). Further, the intermediate pocket 143 may be provided to recess from the bottom surface 147. Even this configuration makes it possible to successfully perform switching from the low-speed rotation mode to the high-speed rotation mode.

Figure 12:
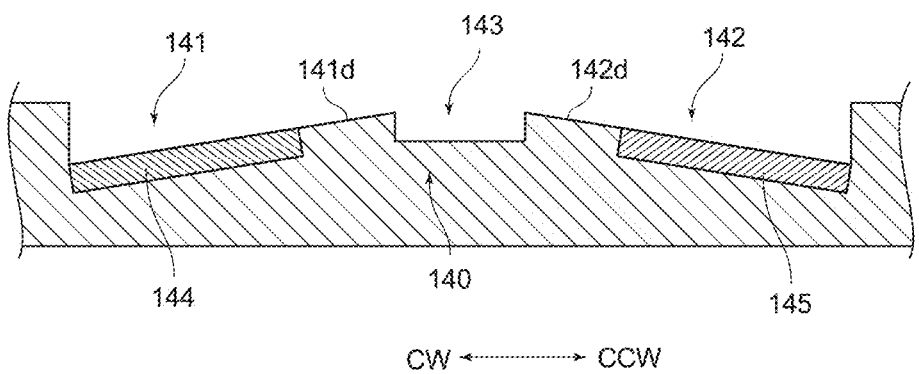
FIG. 12 is a sectional view illustrating the configuration of a clutch receiving member according to another modification example.

FIG. 12 is a sectional view illustrating the configuration of a clutch receiving member 140 according to another modification example. For example, when the configuration illustrated in FIG. 11 is difficult to realize because the stroke of the clutch pin 131 cannot be sufficiently ensured or the like, the clutch receiving member 140 may be configured as illustrated in FIG. 12. In the configuration illustrated in FIG. 12, the bottom portion of the hoisting-side pocket 141 constitutes an inclined surface 141d, so that when the clutch pin 131 passes through the inclined surface 141d, the clutch pin 131 enters the intermediate pocket 143. Note that as is clear from FIG. 12, the surface side of the magnetic plate 144 also constitutes the inclined surface 141d.

Similarly, the bottom portion of the lowering-side pocket 142 constitutes an inclined surface 142d, so that when the clutch pin 131 passes through the inclined surface 142d, the clutch pin 131 enters the intermediate pocket 143. Here, the surface side of the magnetic plate 145 also constitutes the inclined surface 142d. Even this configuration makes it possible to successfully perform switching from the low-speed rotation mode to the high-speed rotation mode.

Further, the provision of the intermediate pocket 143 as in the above embodiment may be omitted. For example, a magnet having a magnetic pole which repulse against to the magnetic pole of the clutch pin 131 may be installed at a position corresponding to the intermediate pocket 143. In this case, the clutch pin 131 becomes a state of getting out of the intermediate pocket 143 by the magnetic force.

Further, as the magnetic member, a member other than the magnetic plates 144, 145 may be arranged. For example, a magnetic powder may be supplied to the recessed fitting part 141b, and the magnetic powder may be solidified in the recessed fitting part 141b.

Further, the inside yoke rotary body 110 corresponding to the first rotary body and the outside yoke rotary body 120 corresponding to the second rotary body are not limited to those in the above embodiment, but may be in another shape. An example of the another shape includes a configuration in which the first rotary body is located on the outer diameter side and the second rotary body is located on the inner diameter side. Further, regarding the rotation direction at the hoisting operation, the handwheel 20 and the clutch receiving member 140 are rotated counterclockwise (CCW direction) in the above embodiment. However, at the hoisting operation, the handwheel 20 and the clutch receiving member 140 may be rotated in a direction (CW direction) opposite thereto. In this event, the arrangement of the hoisting-side pocket 141 and the lowering-side pocket 142 is preferably symmetrical to the arrangement illustrated in FIG. 8.

Further, the configuration in which the magnets 122 are provided at the outside yoke rotary body 120 is employed in the above embodiment. However, a configuration in which the magnets 122 are provided at the inside yoke rotary body 110 may be employed, and a configuration in which the magnets 122 are provided at both of the inside yoke rotary body 110 and the outside yoke rotary body 120 may be employed.

The invention claimed is:

1. A chain block capable of moving up and down a cargo accompanying a hoisting operation and a lowering operation, the chain block comprising:
   a gear mechanism configured to transmit, in a speed-increasing state, drive from a handwheel to a first rotary body;
   the first rotary body to which rotation from the gear mechanism is transmitted in a high-speed rotation mode, and in which a first tooth part formed of a magnetic material and constituting a magnetic clutch mechanism is arranged in a circumferential direction;
   a second rotary body comprising a second tooth part formed of a magnetic material, capable of transmitting, at a first position, rotation torque of prescribed torque or more by magnetic attraction force to/from the first tooth part and constituting the magnetic clutch mechanism, in which the rotation torque by the magnetic attraction force to/from the first tooth part is smaller than the prescribed torque at a second position slid from the first position in a thrust direction perpendicular to a rotation direction;
   a magnetic provided at least one of the first rotary body and the second rotary body;
   a clutch pin integrally provided with the second rotary body and formed of a magnetic material; and
   a clutch receiving member formed of a non-magnetic material, and comprising a plurality of recessed pockets configured to realize mechanical coupling by entrance of the clutch pin according to a slide of the second rotary body,
   wherein
   the plurality of pockets comprise:
      a hoisting-side pocket which the clutch pin enters at the hoisting operation and in which a magnetic member to which the clutch pin is magnetically attracted is arranged;
      a lowering-side pocket which the clutch pin enters at the lowering operation and in which a magnetic member to which the clutch pin is magnetically attracted is arranged; and
      an intermediate pocket which exists between the hoisting-side pocket and the lowering-side pocket and which the clutch pin enters in a state of not being magnetically attracted, and
   at both end portions in the circumferential direction of the intermediate pocket, locking walls to which the clutch pin is locked are provided, and the clutch pin is locked to the locking wall in a state in which the clutch pin is prevented from coming out of the intermediate pocket in rotation of the clutch receiving member.

2. The chain block according to claim 1, wherein:
   an outer peripheral protruding part in a circular ring shape formed of a magnetic material is arranged adjacent to the first tooth part; and
   the intermediate pocket has a depth at a degree at which the outer peripheral protruding part and the second tooth part magnetically couple with each other.

3. A chain block capable of moving up and down a cargo accompanying a hoisting operation and a lowering operation, the chain block comprising:
   a gear mechanism configured to transmit, in a speed-increasing state, drive from a handwheel to a first rotary body;
   the first rotary body to which rotation from the gear mechanism is transmitted in a high-speed rotation mode, and in which a first tooth part formed of a magnetic material and constituting a magnetic clutch mechanism is arranged in a circumferential direction;
   a second rotary body comprising a second tooth part formed of a magnetic material, capable of transmitting, at a first position, rotation torque of prescribed torque or more by magnetic attraction force to/from the first tooth part, and constituting the magnetic clutch mechanism, in which the rotation torque by the magnetic attraction force to/from the first tooth part is smaller than the prescribed torque at a second position slid from the first position in a thrust direction perpendicular to a rotation direction;
   a magnet provided at least one of the first rotary body and the second rotary body;
   a clutch pin integrally provided with the second rotary body and formed of a magnetic material; and
   a clutch receiving member formed of a non-magnetic material, and comprising a plurality of recessed pockets configured to realize mechanical coupling by entrance of the clutch pin according to a slide of the second rotary body,
   wherein
   the plurality of pockets comprise:
      a hoisting-side pocket which the clutch pin enters at the hoisting operation and in which a magnetic member to which the clutch pin is magnetically attracted is arranged;
      a lowering-side pocket which the clutch pin enters at the lowering operation and in which a magnetic member to which the clutch pin is magnetically attracted is arranged; and
      an intermediate pocket which exists between the hoisting-side pocket and the lowering-side pocket and which the clutch pin enters in a state of not being magnetically attracted,
   a first tapered surface inclining from an inside of the hoisting-side pocket toward a surface of the clutch receiving member as the first tapered surface goes from the hoisting-side pocket to the intermediate pocket is provided between the pocket and the intermediate pocket;
   a second tapered surface inclining from an inside of the lowering-side pocket toward the surface of the clutch receiving member as the second tapered surface goes from the lowering-side pocket to the intermediate pocket is proved between the lowering-side pocket and the intermediated pocket; and
   the first tapered surface is provided to have a small inclination angle with respect to the surface of the clutch receiving member as compared with the second tapered surface.

4. The chain block according to claim 3, wherein
   at both end portions in the circumferential direction of the intermediate pocket, locking walls to which the clutch pin is locked are provided, and the clutch pin is locked to the locking wall in a state in which the clutch pin is prevented from coming out of the intermediate pocket in rotation of the clutch receiving member.

5. The chain block according to claim 4, wherein:

an outer peripheral protruding part in a circular ring shape formed of a magnetic material is arranged adjacent to the first tooth part; and the intermediate pocket has a depth at a degree at which the outer peripheral protruding part and the second tooth part magnetically couple with each other.

6. The chain block according to claim 3, wherein:

an outer peripheral protruding part in a circular ring shape formed of a magnetic material is arranged adjacent to the first tooth part; and the intermediate pocket has a depth at a degree at which the outer peripheral protruding part and the second tooth part magnetically couple with each other.

\* \* \* \* \*